United States Patent
Wei et al.

(10) Patent No.: US 11,305,790 B2
(45) Date of Patent: Apr. 19, 2022

(54) SELF-DRIVING STEEL COIL TRANSPORT VEHICLE CAPABLE OF ACTIVE STEERING

(71) Applicant: BEIJING SHOUGANG INTERNATIONAL ENGINEERING TECHNOLOGY CO., LTD., Beijing (CN)

(72) Inventors: Fuqiang Wei, Beijing (CN); Jianli Yang, Beijing (CN); Jiangtao Zheng, Beijing (CN)

(73) Assignee: BEIJING SHOUGANG INTERNATIONAL ENGINEERING TECHNOLOGY CO., LTD., Beijing (CN)

( * ) Notice: Subject to any disclaimer, the term of this patent is extended or adjusted under 35 U.S.C. 154(b) by 829 days.

(21) Appl. No.: 16/300,587

(22) PCT Filed: Jan. 2, 2018

(86) PCT No.: PCT/CN2018/070055
§ 371 (c)(1),
(2) Date: Nov. 12, 2018

(87) PCT Pub. No.: WO2018/127040
PCT Pub. Date: Jul. 12, 2018

(65) Prior Publication Data
US 2019/0300024 A1 Oct. 3, 2019

(30) Foreign Application Priority Data

Jan. 5, 2017 (CN) .......................... 201710008532.3
Dec. 26, 2017 (CN) .......................... 201711433032.0

(51) Int. Cl.
*B61D 3/16* (2006.01)
*B61F 3/04* (2006.01)
*B65G 41/02* (2006.01)

(52) U.S. Cl.
CPC ................ *B61D 3/166* (2013.01); *B61F 3/04* (2013.01); *B65G 41/02* (2013.01)

(58) Field of Classification Search
CPC ........ B61D 3/166; B61D 15/00; B61D 45/00; B61D 3/16; B61F 3/04; B61F 5/16;
(Continued)

(56) References Cited

U.S. PATENT DOCUMENTS 1,769,709 A * 7/1930 O'Connor ................ B61F 5/18
   105/200
2,070,437 A * 2/1937 Kjolseth ................... B61F 5/16
   384/422

(Continued)

FOREIGN PATENT DOCUMENTS

CN     2780684 Y     5/2006
CN     204264146   *  4/2015
(Continued)

*Primary Examiner* — Mark T Le
(74) *Attorney, Agent, or Firm* — Bayramoglu Law Offices LLC

(57) ABSTRACT

A self-driving steel coil transport vehicle capable of active steering includes a load-bearing device, bogies mounted below the load-bearing device, and wheels mounted under the bogies. Two bogies are provided and arranged in a front-rear manner along the running direction of the transport vehicle. Four wheels are mounted under each bogie, and the load-bearing device is articulated with the two bogies, respectively. The transport vehicle is drivable in both a straight line and curves.

19 Claims, 7 Drawing Sheets

(58) Field of Classification Search
CPC .... B61F 19/04; B61F 5/18; B61F 5/52; B61F 5/14; B65G 41/02; B65G 35/00; Y02T 30/00
See application file for complete search history.

(56) References Cited

U.S. PATENT DOCUMENTS

| | | | |
|---|---|---|---|
| 3,147,715 A * | 9/1964 | Myers | B61D 3/166 410/45 |
| 3,658,011 A * | 4/1972 | West | B21C 47/24 410/45 |
| 4,112,724 A | 9/1978 | Claesson et al. | |
| 4,222,694 A * | 9/1980 | Ward | B61C 13/00 410/45 |
| 4,398,330 A * | 8/1983 | Meadows | B61F 5/16 105/199.4 |
| 8,729,856 B2 * | 5/2014 | Nathan | H01R 13/6683 320/109 |
| 2004/0240760 A1 * | 12/2004 | Peet | F16C 11/0661 384/420 |

FOREIGN PATENT DOCUMENTS

| | | |
|---|---|---|
| CN | 204264146 U | 4/2015 |
| CN | 204399170 U | 6/2015 |
| CN | 105857323 A | 8/2016 |
| CN | 205589226 U | 9/2016 |
| CN | 106740916 A | 5/2017 |
| CN | 206374745 U | 8/2017 |
| EP | 0275922 A2 | 7/1988 |
| GB | 1367340 A | 9/1974 |
| GB | 1386912 A | 3/1975 |
| JP | S60108583 U | 7/1985 |
| JP | H06144219 A | 5/1994 |
| KR | 101678562 B1 | 11/2016 |

* cited by examiner

SELF-DRIVING STEEL COIL TRANSPORT VEHICLE CAPABLE OF ACTIVE STEERING

CROSS REFERENCE TO RELATED APPLICATIONS

This application is the national phase entry of International Application No. PCT/CN2018/070055, filed on Jan. 2, 2018, which is based upon and claims priority to Chinese Patent Application No. 201710008532.3, entitled "Self-driving Steel Coil Transport Vehicle Capable of Active Steering", filed on Jan. 5, 2017, and Chinese Patent Application No. 201711433032.0, entitled "Self-driving Steel Coil Transport Vehicle Capable of Active Steering", filed on Dec. 26, 2017, the entire contents of which are incorporated herein by reference.

TECHNICAL FIELD

The present invention relates to the field of logistics and transportation equipment, and particularly to a self-driving steel coil transport vehicle capable of active steering.

BACKGROUND

At present, the steel coil transportation between the subsequent processes of the cold rolling production line or hot rolling production line for the metallurgical plant mainly includes the transportation modes such as walking beam, chain transportation, pallet transportation, vehicle transportation, train transportation, etc. The modes of walking beam and chain transportation have a slow running rhythm and require a large amount of equipment maintenance, so these two modes are no longer adopted by the newly established steel mills. The running rhythm of the pallet transportation can meet the requirements of fast-paced production. However, the pallet transportation pertains to the roller transportation, which is not suitable for occasions where there is a need to cross an outdoor road. In fact, within the metallurgical enterprise, it is required to move cross the road in the steel coil transportation either between the steel strip production lines and the steel coil warehouse, or the steel coil warehouse and the docks. If the pallet transportation mode is used, then the road must be closed to others. For this reason, in most cases, manufacturers can only transport steel coils by means of vehicle transportation. In another aspect, when changing the route, a turntable is required for the pallet transportation, resulting in an inflexible transportation route. As for the vehicle transportation, it has a strong adaptability to the context of the road, allows to move in a straight line and in a curve, and it is enabled to cross the road. Accordingly, at present, the vehicle transportation is often used for transporting the steel coils between the steel coil warehouses and between the steel coil warehouse and docks. However, since the mode of vehicle transportation pertains to the rubber wheel transportation, there is a high running resistance. Moreover, for the heavy-duty transportation of steel coils, the energy consumption cost during transportation is very high, while the air and environment are polluted, so it is neither energy-saving nor environmentally friendly. Train transportation pertains to the rail transportation, which has a large transportation capacity and a strong environmental adaptability, can operate in the open-air, and can cross the road. However, because the equipment is of large-scale and a large turning radius is required, the train transportation is merely suitable for the batch input of the raw materials and batch output of the finished products in the strip steel workshop, unable to be turned around inside the metallurgical plant, and not suitable for the transport of the steel coils among the processes of production line.

SUMMARY

In order to solve the above technical problems, the present invention provides a self-driving steel coil transport vehicle capable of active steering. The transport vehicle is suitable for flexible transport mutes and can be driven in both a straight line and curves while having the advantages of energy-saving, environmentally friendly vehicle and increasing adaptability.

The technical solution of the present invention to solve the above-mentioned technical problems is as follows. A self-driving steel coil transport vehicle capable of active steering includes a load-bearing device, a bogie mounted below the load-bearing device, and wheels mounted under the bogie. Two bogies are provided and arranged in a front-rear manner along the running direction of the transport vehicle. Four wheels are mounted under each bogie, and the load-bearing device is articulated with the two bogies, respectively.

Further, the bogie includes a vehicle frame. The vehicle frame includes four wheel mounting portions, and the four wheel mounting portions are pairwise disposed at the lower portions of both sides of the vehicle frame, and the wheel mounting portions are each mounted with one wheel A middle portion of the vehicle frame is provided with a bearing mounting hole facing upwardly, and the bearing mounting hole is internally provided with a horizontal stepped surface. The bogie further includes a joint bearing. The joint bearing is matched and connected with the bearing mounting hole, and a lower bottom surface of the joint bearing is installed on and fitted with the horizontal stepped surface. The bogie further includes a joint support seat. A lower portion of the joint support seat is a shaft end, and the shaft end is insertable into an inner ring of the joint bearing and is matched and connected with the joint bearing. An upper portion of the joint support seat is a connecting portion through which the joint support seat is fixedly connected to a lower portion of the load-bearing device.

Further, the bogie also includes a baffle mounted on an end of the shaft end, and one side surface of the baffle contacts an inner ring of the joint bearing.

Further, the bogie further includes a locking plate. A middle portion of the joint support seat is provided with a groove, and the locking plate is mounted above the vehicle frame and inserted in the groove.

Further, the bogie further includes a locking plate. A middle portion of the joint support seat is provided with a protrusion, and the locking plate is mounted above the vehicle frame and presses the protrusion.

Further, the connecting portion is a flange. The flange is provided with a fastening hole, and the fastening hole forms a circular track when rotating with the flange. Each vehicle frame is provided with two locking plates, and the locking plates are detachably mounted on an upper surface of the vehicle frame by a plurality of locking plate bolts. Some or all of the plurality of locking plate bolts are located below the circular track.

Further, the steel coil transport vehicle further includes a travel motor. At least two of the travel motors are provided. At least one of the wheels on each of the two sides of the vehicle frame is connected to the travel motor in a transmission way, and each travel motor individually controls and drives the wheel connected to the travel motor.

Further, the travel motor is a speed reducing motor, and the travel motor is provided with a brake and a manual release handle.

Further, above the vehicle frame, two wear-proof plates respectively located on two sides of the bearing mounting hole are provided. Support wheels having the same amount as the wear-proof plates are provided at a position corresponding to the wear-proof plates below the load-bearing device.

Further, the steel coil transport vehicle further includes an electric control cabinet, a vehicle power supply, and a charging rail. The electric control cabinet, the vehicle power supply, and the charging rail are mounted on the load-bearing device. The vehicle power supply is a rechargeable power supply device, and the charging rail can be connected to a fixed charging end on the ground to charge the vehicle power supply.

Further, the load-bearing device includes a steel coil saddle, and a vehicle power supply bracket, and an electric control cabinet bracket respectively disposed at two ends of the steel coil saddle. The vehicle power supply and the electric control cabinet are respectively mounted on the vehicle power supply bracket and the electric control cabinet bracket. A middle portion of the steel coil saddle is provided with a coil-bearing portion having longitudinal and transverse groove structures. The coil-bearing portion is located in the middle of the two bogies.

Further, the steel coil transport vehicle further includes a front-end bumper bar and a rear-end bumper bar. The front-end bumper bar is mounted on a front end of a front bogie, and the rear-end bumper bar is mounted on a rear end of a rear bogie. The front-end bumper bar corresponds to a position of a rear-end bumper bar of a front vehicle running on the same track, and the rear-end bumper bar corresponds to a position of a front-end bumper bar of a rear vehicle running on the same track.

The present invention has the following advantages. The load-bearing device and the bogies are articulated through the joint support seat and the joint bearing, and the two bogies have two articulation points. In addition, because the joint bearing is spherically articulated, not only the joint bearing can be subjected a large pressure, but also a free steering is enabled when the transport vehicle passes a bend. Moreover, small rotations at multiple angles are self-adaptive, so that the load-bearing device and the steering system at the bottom can be freely steered when the transport vehicle passes the bend, without causing the situation where the wheels get stuck on the track, thereby realizing the turning requirement of the heavy-duty transport vehicle.

The present invention not only ensures the degree of freedom of the mechanism required for the turning of the transport vehicle, but also allows to set the speed according to the turning radius because of a method of separately driving the wheels on the inner rail and the outer rail. Therefore, the steel coil transport vehicle is enabled to operate on a track with a small turning radius, and the change of the running direction of the transport vehicle can be realized without the turntable, so that the present invention saves investment and increases the flexibility of the transport routes.

This transport vehicle comes with its own power source (e.g. the rechargeable power source such as super capacitor or lithium battery), which is energy-saving and environmentally friendly. The transport vehicle has flexible transport routes, and is enabled to run on both a straight road and a curved road. Moreover, the transport vehicle does not have strict requirements on the context and can be operated outdoors and crossing the road. Using this transport vehicle to transport the steel coils can realize the one-stop transportation within the production lines and from the production lines to the docks, which greatly improves the adaptability. At the same time, the technical solution provided by the present invention has a simple structure, is easy to implement, and has low cost.

Wherein, the Reference Number of the Elements in the Figures are Expressed as Below:

1. bogie; 2. wheel; 3. travel motor; 4. support wheel; 5. electric control cabinet; 6. vehicle power supply; 7. charging rail; 8. steel coil saddle; 9. vehicle power supply bracket; 10. electric control cabinet bracket; 11. vehicle frame; 12. joint bearing; 13. joint support seat; 14. baffle; 15. locking plate; 31. manual release handle; 81. coil-bearing portion; 100. steel coil; 111. wheel mounting portion; 112. bearing mounting hole; 113. horizontal stepped surface; 114. wear-proof plate; 115. front-end bumper bar; 116. rear-end bumper bar; 131. shaft end; 132. flange; 133. groove; 134. protrusion; 151. locking plate bolt; 1321. fastening hole; 1322. circular track.

DETAILED DESCRIPTION OF THE EMBODIMENTS

The present invention will be described in detail hereinafter by embodiments with reference to the drawings. The principles and features of the present invention are described below with reference to the drawings. It should be noted that the embodiments of the present application and the features of the embodiments may be combined with each other without conflict. The embodiments listed are merely used to illustrate the present invention rather than limit the scope of the present invention.

Figure 1:
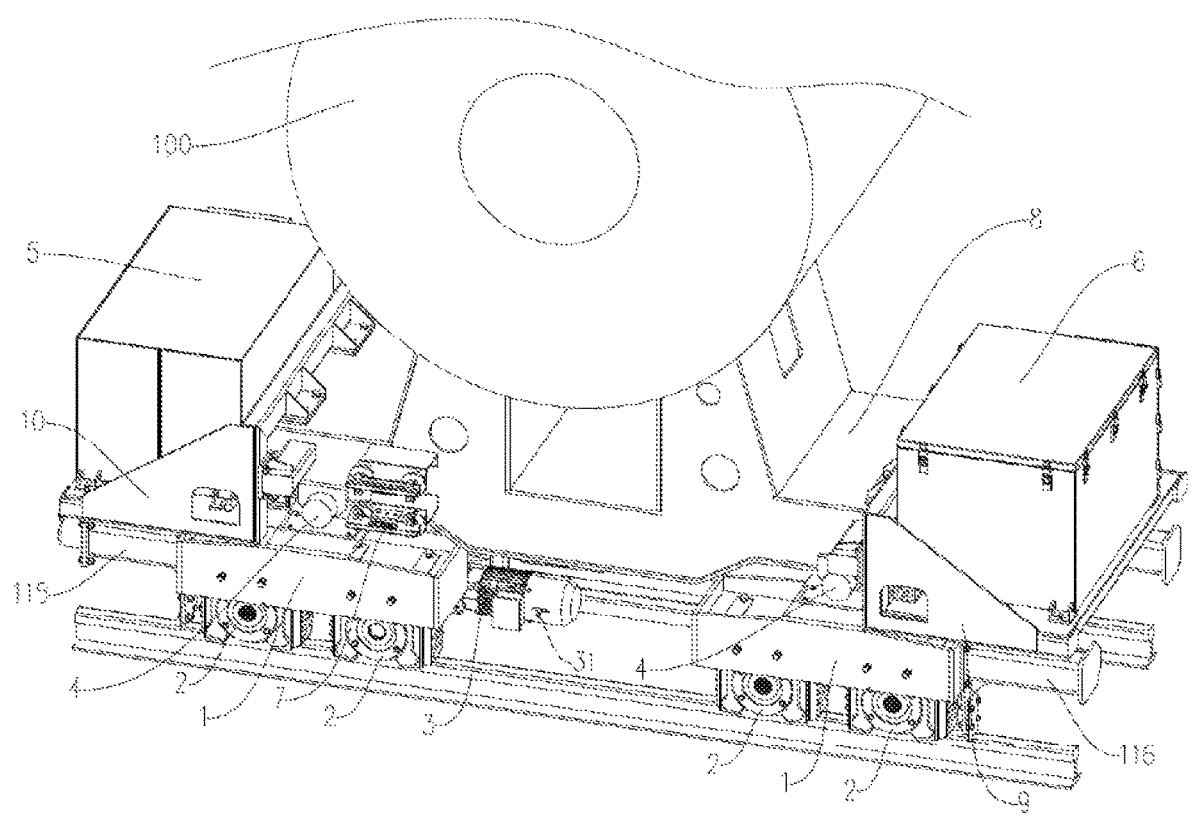
FIG. 1 is an overall three-dimensional structural diagram of a self-driving steel coil transport vehicle capable of active steering according to an embodiment of the present invention.
Figure 2:
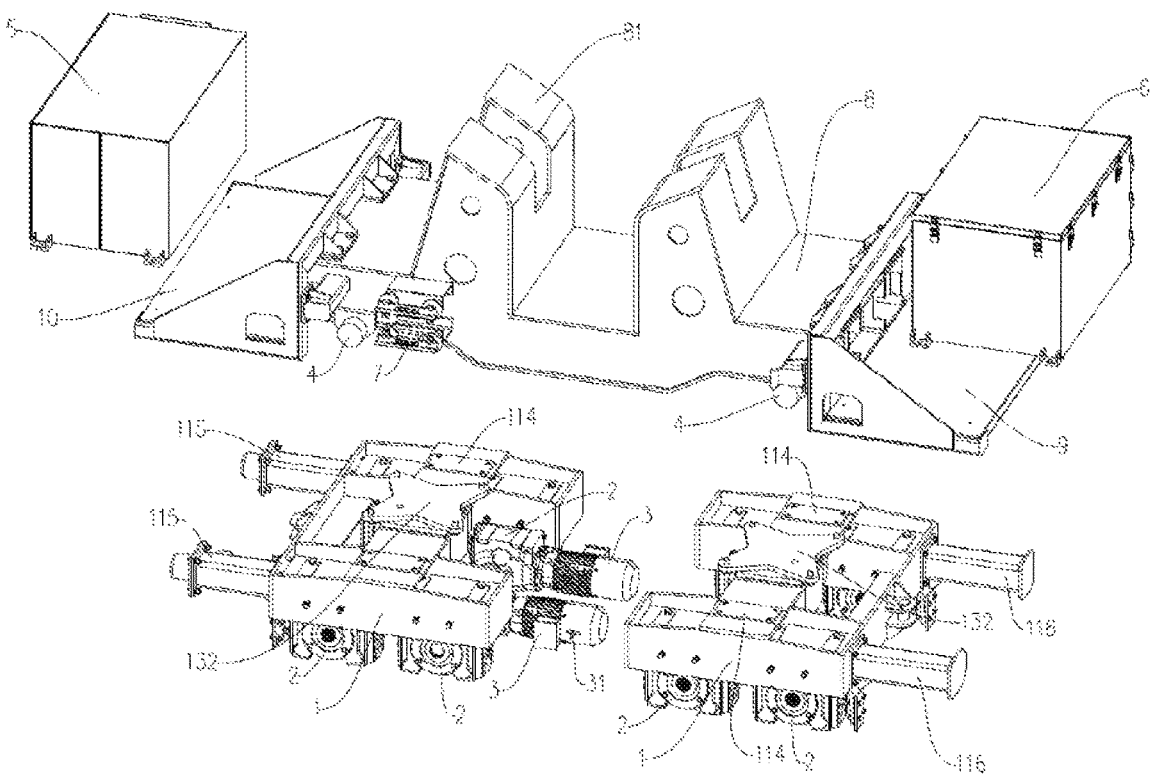
FIG. 2 is a partial disassembly diagram of the embodiment shown in FIG. 1.
Figure 3:
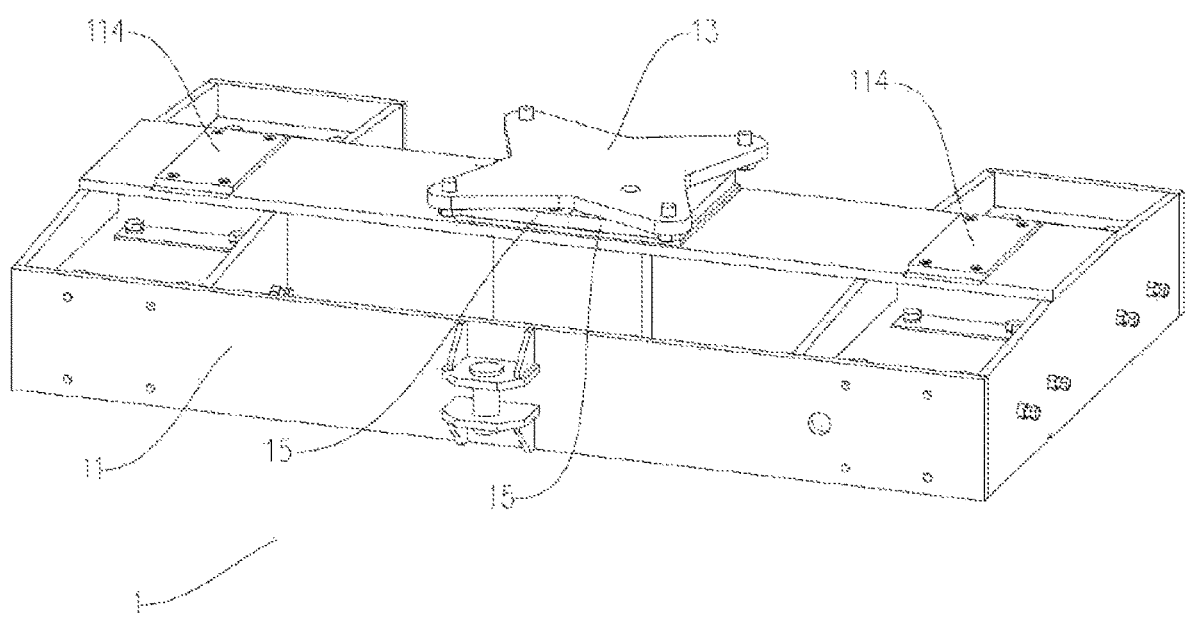
FIG. 3 is a three-dimensional structural diagram showing an embodiment of a bogie for a self-driving steel coil transport vehicle capable of active steering of the present invention.
Figure 4:
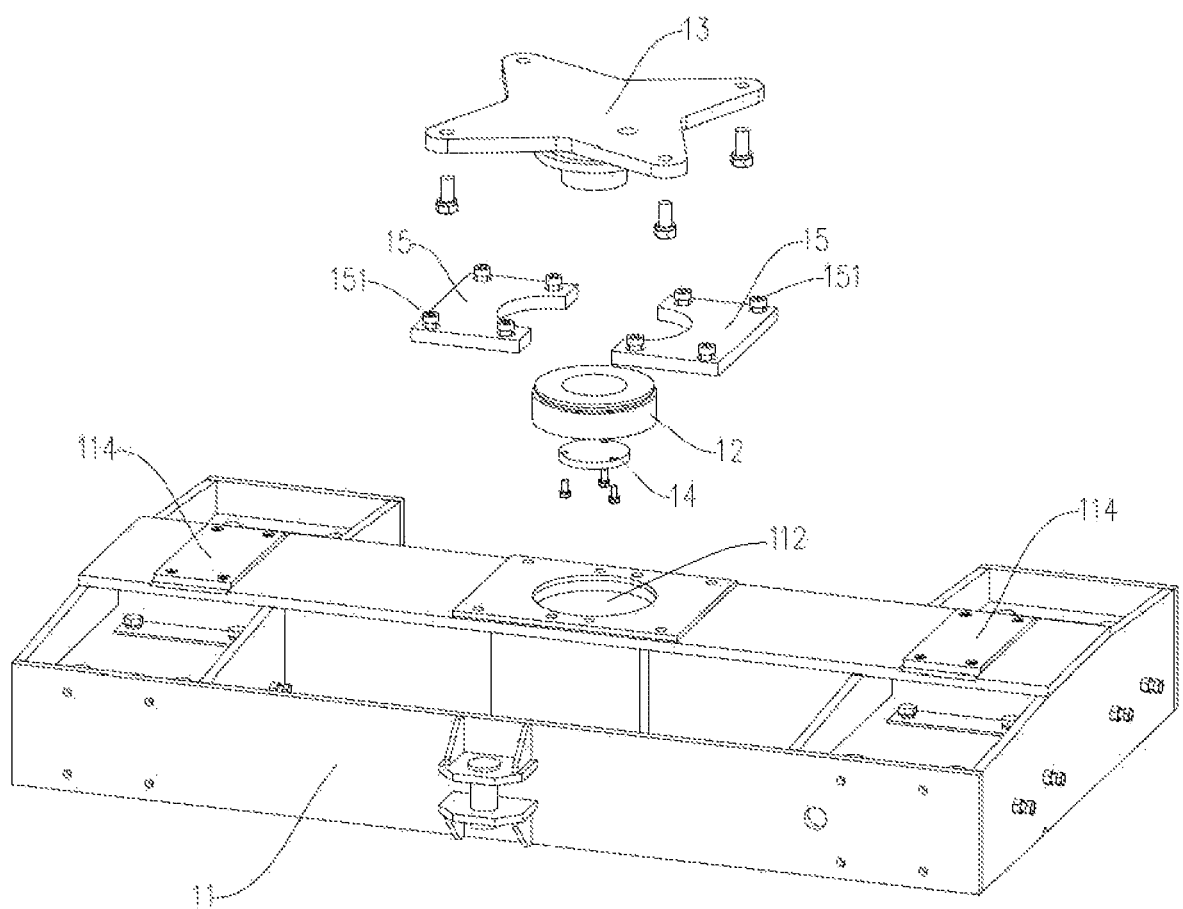
FIG. 4 is a disassembled structural diagram of the bogie shown in FIG. 3.
Figure 5:
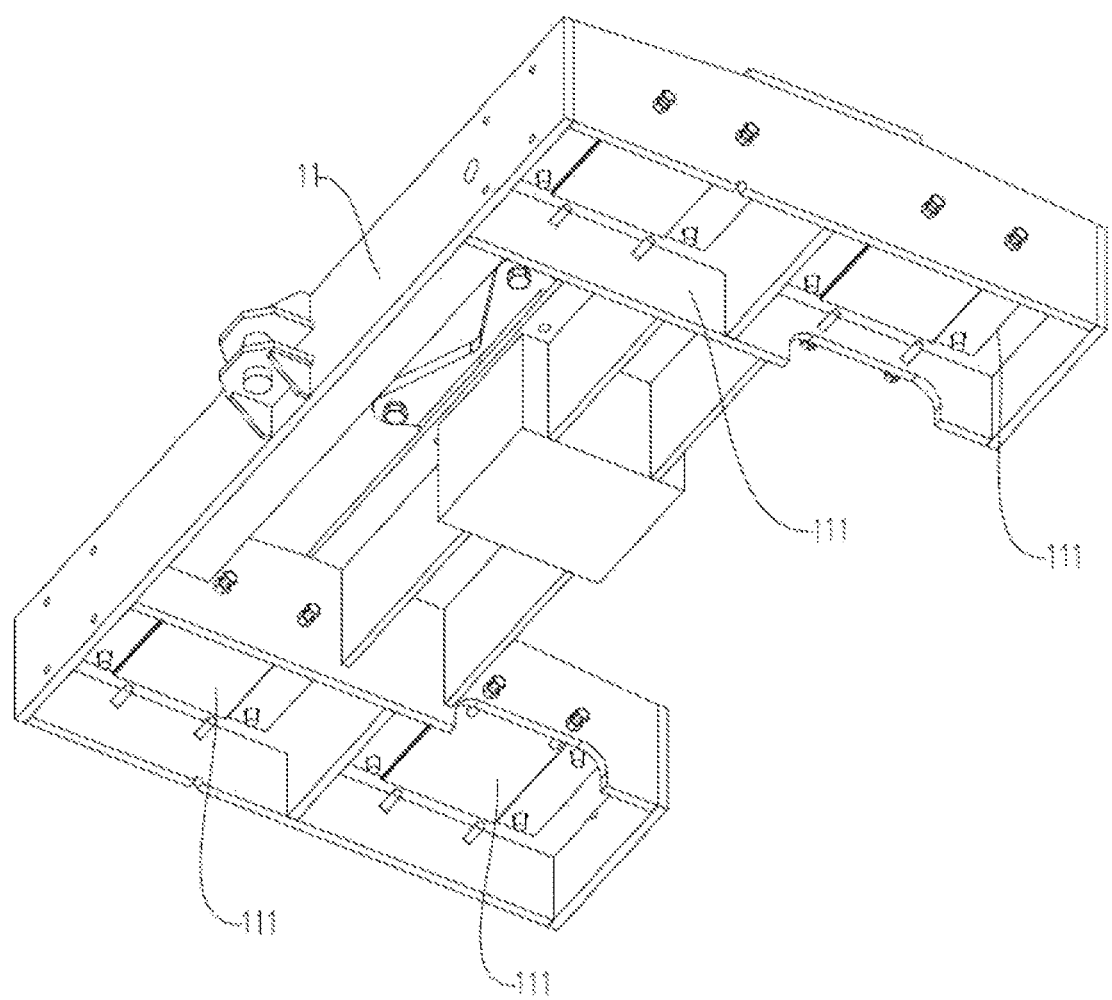
FIG. 5 is a structural diagram of a bottom of the bogie shown in FIG. 3.
Figure 6:
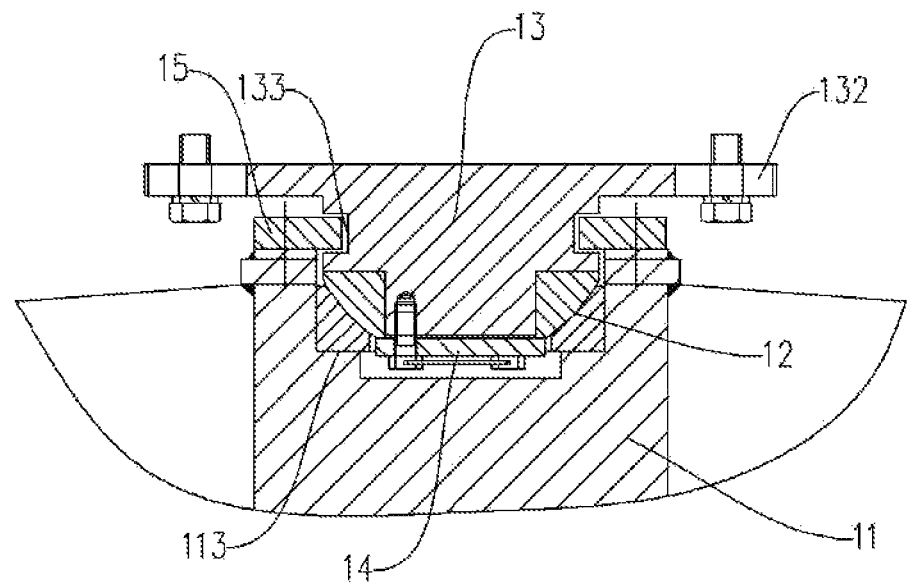
FIG. 6 is a schematic diagram showing a dissection structure of an articulated portion of a joint bearing according to an embodiment of a bogie.
Figure 7:
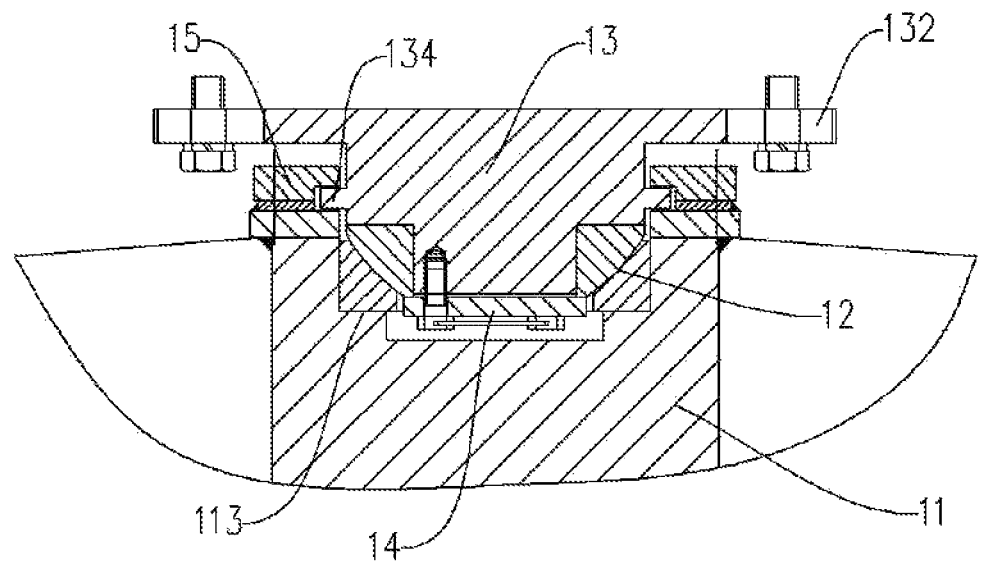
FIG. 7 is a schematic diagram showing a dissection structure of an articulated portion of a joint bearing according to another embodiment of the bogie.
Figure 8:
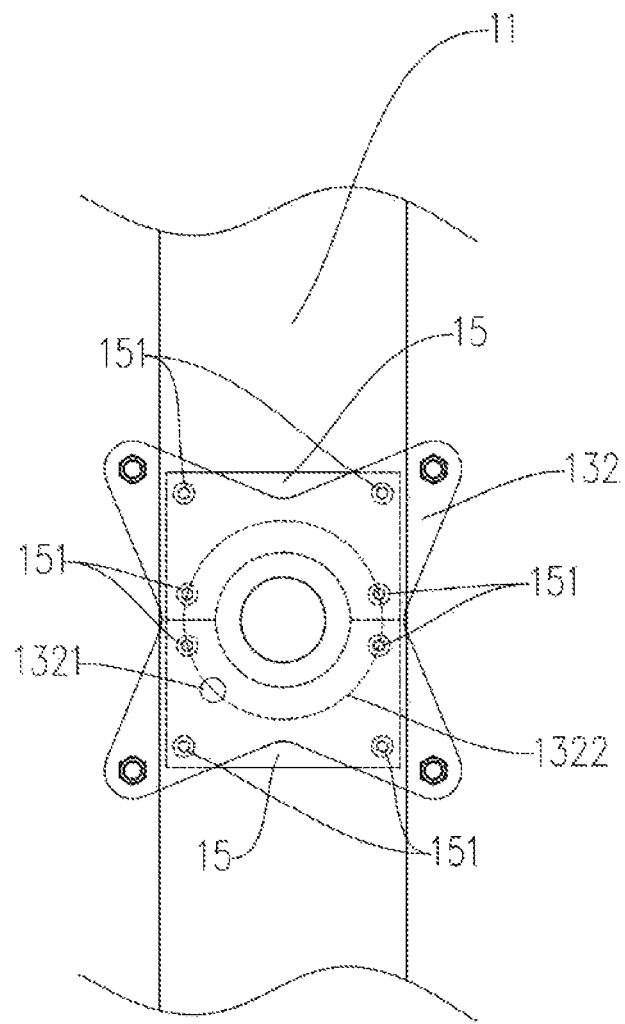
FIG. 8 is a top view of the structure of the bogie shown in FIG. 3.
Figure 9:
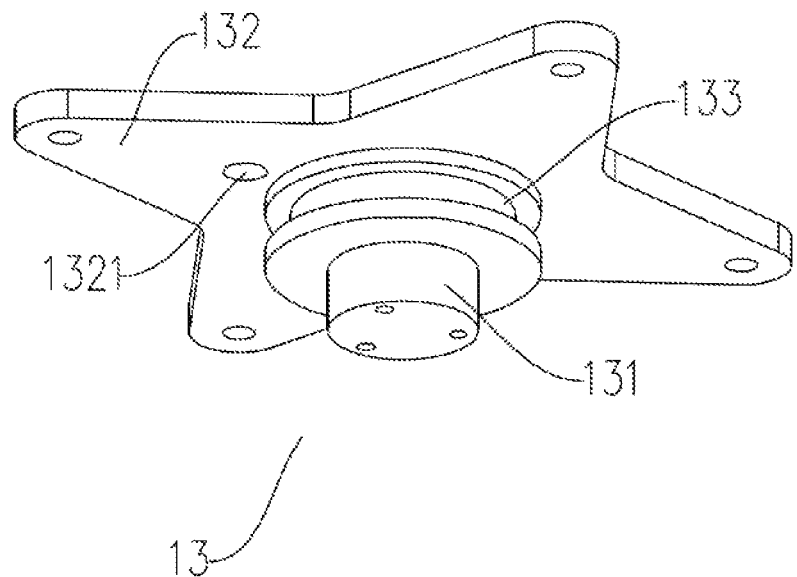
FIG. 9 is a three-dimensional structural diagram showing an embodiment of a joint support seat.
Figure 10:
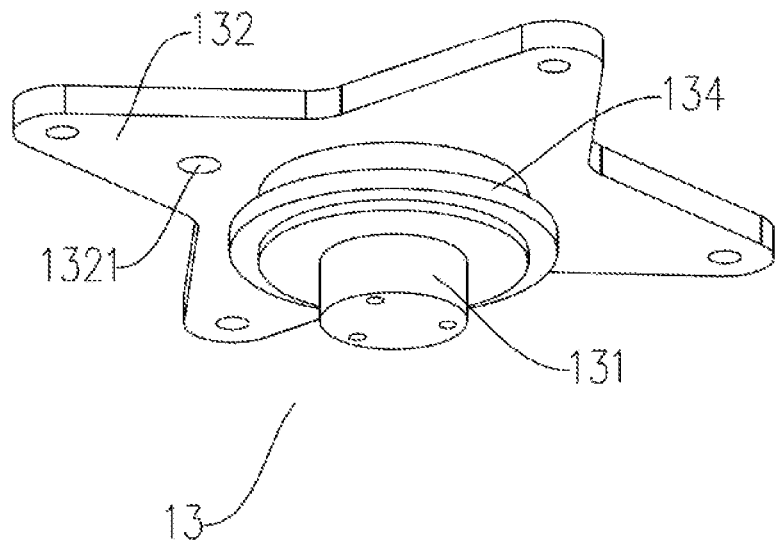
FIG. 10 is a three-dimensional structural diagram showing another embodiment of the joint support seat.

As shown in FIGS. 1-10, FIG. 1 is an overall three-dimensional structural diagram of a self-driving steel coil transport vehicle capable of active steering according to an embodiment of the present invention. FIG. 2 is a partial disassembly diagram of the embodiment shown in FIG. 1. FIG. 3 is a three-dimensional structural diagram showing an embodiment of a bogie for a self-driving steel coil transport vehicle capable of active steering of the present invention. FIG. 4 is a disassembled structural diagram of the bogie shown in FIG. 3. FIG. 5 is a structural diagram of a bottom of the bogie shown in FIG. 3. FIG. 6 is a schematic diagram showing a dissection structure of an articulated portion of a joint bearing according to an embodiment of a bogie. FIG. 7 is a schematic diagram showing a dissection structure of an articulated portion of a joint bearing according to another embodiment of the bogie. FIG. 8 is a top view of the structure of the bogie shown in FIG. 3. FIG. 9 is a three-dimensional structural diagram showing an embodiment of a joint support seat. FIG. 10 is a three-dimensional structural diagram showing another embodiment of the joint support seat.

As shown in the figures, according to an embodiment of the present invention, a self-driving steel coil transport vehicle capable of active steering includes a load-bearing device, bogies 1 mounted below the load-bearing device, and wheels 2 mounted under the bogies 1. Two bogies 1 are provided and arranged in a front-rear manner along the running direction of the transport vehicle. Four wheels 2 are mounted under each bogie 1, and the load-bearing device is articulated with the two bogies 1, respectively.

The load-bearing device can be designed according to the materials to be transported. In a steel coil transport system used in the metallurgical production, the load-bearing device may be designed as the steel coil saddle 8 shown in FIGS. 1 and 2. A middle portion of the steel coil saddle 8 is provided with a coil-bearing portion 81 having longitudinal and transverse groove structures. The steel coil 100 is placed on the coil-bearing portion 81. An upper portion of the coil-bearing portion 81 is V-shaped. The steel coil saddle 8 designed in this way not only can meet the requirements of the coil uploading and the steel coil bundling, but also facilitates the heat dissipation of the steel coil 100. The V-shape also makes the steel coil 100 more stable on the steel coil saddle 8, and the steel coil 100 is not easy to fall down.

It can be understood that in the field of heavy-duty logistics, in order to transport different steels or other goods, the load-bearing device may also have other forms, such as a flat pallet, a basket with a bucket, etc. In addition, the load-bearing device can be a single steel structural member or a combination of a plurality of components. For example, the load-bearing device may include a separate vehicle frame, and the vehicle frame is connected to the bogie 1, and then the steel coil saddle 8 is fixedly mounted on the vehicle frame. In a preferred embodiment of the present invention, a lower portion of the steel coil saddle 8 is directly connected to the bogie 1, so that the overall structure is more compact, less parts are required during processing, the manufacturing is convenient, and the production period is greatly reduced. Therefore, the structure of the load-bearing device is not specifically limited in the present invention.

In the field of steel coil transportation, generally, the steel coil 100 to be transported is heavy. In order to make the equipment more reasonably forced and prolong the service life of the equipment, the coil-bearing portion 81 is located in the middle portion of the two bogies 1, thereby making the articulated portions of the coil saddle 8 and the two bogies 1 basically subjected to the same forces, and avoiding the case that one of the articulated portions is excessively forced which has influence on the service life.

As shown in FIGS. 3-5, the present invention provides a preferred embodiment of the bogie 1. The bogie 1 includes a vehicle frame 11, and the vehicle frame 11 includes four wheel mounting portions 111. The four wheel mounting portions 111 are pairwise disposed at the lower portions of both sides of the vehicle frame 11, and each wheel mounting portion 111 is mounted with one wheel 2. Generally speaking, one bogie 1 is equipped with four wheels which are pairwise configured opposite to each other, so that a "four-wheel vehicle" with a small wheelbase between wheels at a front row and wheels at a rear row can be formed. Further, the load-bearing device is supported by two "four-wheel vehicle" together. In this way, it can be ensured that the transport vehicle can turn freely while passing a bend without getting stuck, so the problem that the transport vehicle, in the prior art, is unable to turn around is addressed.

A beam is arranged between the wheel mounting portions on both sides of the vehicle frame 11. A middle portion of the beam is provided with a bearing mounting hole 112 facing upwardly. The bearing mounting hole 112 is disposed in the middle portion, so as to balance the force exerted on the wheels on both sides. The bearing mounting hole 112 is internally provided with a horizontal stepped surface 113 for mounting a joint bearing 12. The joint bearing 12 is matched and connected with the bearing mounting hole 112, and a lower bottom surface of the joint bearing 12 is installed on and fitted with the horizontal stepped surface 113. The vehicle frame 11 also includes a joint support seat 13, and a lower portion of the joint support seat 13 is a shaft end 131. The shaft end 131 is insertable into an inner ring of the joint bearing 12 and is matched and connected with the joint bearing 12. The upper portion of the joint support seat 13 is a connecting portion through which the joint support seat 13 can be connected to a lower portion of the load-bearing device, so as to form the articulated connection between the load-bearing device and the bogie 1.

In order to ensure a tight connection between the joint support seat 13 and the joint bearing 12, a baffle 14 is further provided at an end of the shaft end 131 of the joint support seat 13, and a side surface of the baffle 14 contacts the inner ring of the joint bearing 12. The baffle 14 and the shaft end 131 can be connected by three bolts having through holes at the ends, and the three bolts are fastened by an iron wire which passes through the three bolts, so as to prevent loosening of the bolts.

In order to prevent the joint bearing 12 and the joint support seat 13 from detaching from the bearing mounting hole 112, as well as to allow the transport vehicle to be lifted and moved in integral, methods for realizing these objectives are described below.

Preferably, a middle portion of the joint support seat 13 is provided with a groove 133. The groove 133 is located at the entrance of the bearing mounting hole 112, and the groove may either be an annular groove or a partial groove, and the annular groove is preferred. Then, a locking plate 15 is inserted in the groove 133, while the locking plate 15 is mounted and fixed above the vehicle frame 11.

Preferably, the middle portion of the joint support seat 13 is provided with a protrusion 134. The protrusion 134 is located at the entrance of the bearing mounting hole 112, the protrusion may either be an annular protrusion or a partial protrusion, and the annular protrusion is preferred. Then, the projections 134 are pressed by the locking plates mounted on the vehicle frame 11.

In order to facilitate the installation and fixation of the load-bearing device, and to keep the vehicle as stable as possible during transportation process, preferably, the connecting portion is a flange for connection. As shown in the figures, the connecting portion may be a flange 132. Correspondingly, a flange mounting surface should be set under the load-bearing device to ensure a tight connection between the flange and the load-bearing device.

In order to facilitate the installation of the locking plate 15, and to avoid the fastening position of the locking plate 15 being blocked due to the excessive area of the flange 132, a fastening hole 1321 may be arranged on the flange 132. The fastening hole 1321 will form a circular track 1322 when rotating with the flange 132.

Since the locking plate 15 should be installed after the joint support seat 13 is mounted in the bearing mounting hole 112, the locking plate 15 may be designed with a separated type, namely, each vehicle frame 11 is provided with two locking plates 15, and the locking plates 15 are detachably mounted on the upper surface of the vehicle frame 11 by a plurality of locking plate bolts 151. Some or all of the plurality of locking plate bolts 151 are located below the circular track 1322.

In this way, when the locking plate bolt 151 near the bearing mounting hole 112 needs to be fastened, only the joint support seat 13 needs to be rotated to make the fastening hole 1321 located above the locking plate bolt 151 to be fastened, and then the tool passes through the fastening hole 1321 to fasten the locking plate bolt 151, and vice versa. For the assembling and disassembling of the locking plate bolt 151 located far away from the bearing mounting hole 112, and in order to ensure the locking plate bolt 151 not being blocked by the flange 132, the method of opening the holes mentioned above may be used, or, as shown in the figures, one only needs to rotate the flange 132 having concave sides to make the locking plate bolt 151 exposed.

In order to make ensure that the transport vehicle has enough driving force and can turn in a more stable manner, the steel coil transport vehicle further includes a travel motor 3. At least two travel motors 3 are provided, and at least one of the wheels 2 on each side of the two sides of the vehicle frame 11 is connected to the travel motor 3 in a transmission way. Each travel motor 3 individually controls and drives the wheel connected to the travel motor 3. A preferred embodiment is shown in the figures, the wheels 2 under both sides of one of the bogies are each provided with a speed reducing motor. Moreover, by separate control, two wheels 2 on the inner side and the outer side of the track can run in different speeds when turning around, so as to ensure that the wheels do not get stuck. When the vehicle travels in a straight line, the speeds of the two travel motors 3 are kept consistent. When the vehicle is passing the bend, the two travel motors 3 are set with different running speeds according to the radius of the inner side and outer side of the track at the bend. The speed of the wheel at the outer side of the track is faster than the speed of the wheel at the inner side of the track, thereby reducing the wear on the wheel tread and the wheel rim caused by the difference in speeds of the inner side and outer side of the track when passing the bend.

In addition, when there is an emergency, such as a sudden power cutoff, the transport vehicle needs to be stopped to ensure safety. In order to prevent the transport vehicle from continuous sliding due to inertia after the power cutoff and losing control, the travel motor 3 may be provided with a brake and a manual release handle 31 which is pulled down manually. When an unexpected situation occurs, the brake can perform braking, automatically to make sure that the vehicle stops. After the vehicle is stopped, in order to timely remove the transport vehicle in the case that the power is cut off, the travel motor 3 is further provided with the manual release handle 31. When it is necessary to unlock the brake of the travel motor 3 in the braking state, one only needs to manually pull down the manual release handle 31, which is convenient to operate and safer.

Since the load-bearing device and the two bogies 1 form a two-point articulated connection through joint bearings, the transport vehicle would generate a side force due to the inertia during the steering process. Of course, the joint bearing can also bear a part of the side force, but in order to balance the force and improve the service life of the joint bearing, the load-bearing device can be supported on the bogie 1 at other positions. For example, the load-bearing device may be supported against the bogie 1 to form an auxiliary support at the positions between the load-bearing device and the bogie, and on both sides of the articulated portion.

Preferably, four support wheels 4 are arranged below the steel coil saddle 8, and respectively arranged on two sides of the two articulation points. Each two support wheels 4 are supported against one bogie 1, so that the transport vehicle can utilize the two joint bearings 12 on the two moving bogies 1 and the auxiliary support wheels 4 on the steel coil saddle 8 to transmit the load to the bogies 1. The weight from the steel coil 100 and the steel coil saddle 8 is mainly withstood by the two joint bearings 12 on the two bogies 1, and the unbalanced weight is withstood by the two of the four auxiliary support wheels 4 on a single side of the steel coil saddle 8 which then transmits the unbalanced force to the bogie 1. Since the rolling friction, resistance for the relative rotation between the bogie 1 and the reel saddle 8 is small, the wear caused by a torsion force between the wheel rim of the wheels 2 and the track when passing the bend is reduced.

In order to improve the service life, a wear-proof plate 114 may be mounted at a position, corresponding to the support wheel 8, on the vehicle frame 11. Namely, one wear-proof plate 114 is mounted under each support wheel 8. The wear-proof plate 114 may be made of various wear-proof materials, which is not limited in the present invention. The unbalance loading makes the support wheels 8 at one side of the steel coil saddle 2 contact with the wear-proof plate 114 on the bogie 1, thereby forming a 3-point or 4-point support against the two joint bearings 12, so as to ensure the stability of the steel coil saddle 8. Since the support wheels 4 roll on the wear-proof plates 114 in a planar manner, which only play the role of auxiliary supporting the steel coil saddle 8, so the positioning of the steel coil saddle 8 on the two bogies 1 is not affected when the vehicle passes the bend.

In order to meet the requirements of automatic control, the steel coil transport vehicle further includes an electric control cabinet 5, a vehicle power supply 6, and a charging rail 7 which are mounted on the load-bearing device. The vehicle power supply 6 is a rechargeable power supply device, the charging rail 7 can be connected to a fixed charging end on the ground to charge the vehicle power supply 6.

A vehicle power supply bracket 9 and an electric control cabinet bracket 10 are respectively disposed at two ends of the steel coil saddle 8. The vehicle power supply 6 and the electric control cabinet 5 are respectively mounted on the vehicle power supply bracket 9 and the electric control cabinet bracket 10.

The self-driving power of the transport vehicle comes from the vehicle power supply 6. The vehicle power supply 6 may be a super capacitor, a lithium battery, and other power supply devices capable of quick charging, so that the vehicle power supply 6 can be adapted to the transportation system of the metallurgical workshop. Of course, with the development of technology, the vehicle power supply 6 may also be other types of power batteries. The electric energy of the vehicle power supply 6 is converted into two different power sources through the power supply system in the electric control cabinet 5, i.e. 380V industrial power and 24V control power. The 380V alternating current is used to drive the travel motor 4, and the 24V direct current is used to supply power to or control the automation components on the transport vehicle. A charging rail 7 is disposed on the side of the steel coil saddle 8 (or other appropriate positions), and a charging pile is arranged at an appropriate position on the transportation line, which can automatically charge the vehicle power supply 6 on the transport vehicle via the charging rail 7, so that the transport vehicle meets the requirements for fully automated driving.

In addition, in order to ensure safety while driving, the steel coil transport vehicle further includes a front-end bumper bar 115 and a rear-end bumper bar 116. The front-end bumper bar 115 is mounted on a front end of a front bogie 1, and the rear-end bumper bar 116 is mounted on a rear end of a rear bogie 1. The front-end bumper bar 115 corresponds to a position of a rear-end bumper bar 116 of a front vehicle running on the same track, and the rear-end bumper bar 116 corresponds to a position of a front-end bumper bar 115 of a rear vehicle running on the same track. The front-end bumper bar 115 and rear-end bumper bar 116 may also be provided with a buffer unit such as a spring or the like, and may also be provided with a buffer material such as a crash pad, so as to reduce the vibration shock caused by a collision.

In conclusion, the above embodiments not only ensure the degree of freedom of the mechanism required for the steering of the transport vehicle, but also allows to set the speed according to the steering radius due to the wheels on the inner side and outer side of the track being driven separately. Therefore, the steel coil transport vehicle can be operated on a track with small turning radius, and the change of the running direction of the transport vehicle can be realized without the turntable. Moreover, the objective of the self-driving and active steering of the steel coil transport vehicle on the straight track and the curved track are realized, thereby greatly improving the flexibility of the transportation routes. Meanwhile, the transportation vehicle provided by the present invention has a reasonable and compact structure, low investment cost, and high practicability.

In the description of the present invention, it should be understood that the terms such as "upper/up", "lower/down", "front", "rear", "left", "right", "vertical", "horizontal", "top", "bottom", "inside/inner", "outside/outer", "circumferential direction" etc. indicate the locations or positional relationships based on the locations or positional relationships shown in the drawings, which are merely used to facilitate and simplify the description of the present invention, rather than indicate or imply that the device or component referred to must have a specific orientation, or must be constructed and operated in a specific orientation. Therefore, these terms shall not be interpreted as limits of the presented invention.

In the present invention, unless otherwise explicitly specified and limited, the terms such as "install/mount", "interconnect", "connect", and "fix", etc. shall be understood broadly. For example, it can be a fixed connection, a detachable connection, or an integrated connection. Alternatively, it can be a mechanical connection or an electrical connection. Also, it can be directly connected or indirectly connected through an intermediate medium, an interconnection between two components, or an interaction between two components unless explicitly defined otherwise. The specific meaning of the above terms in the present invention should be understood according to the context by those of ordinary skill in the art.

In the present invention, unless otherwise explicitly specified and limited, a first feature "on" or "below/under" a second feature can be interpreted as the first feature and the second feature contact directly, or the first and second features indirectly contact through an intermediate medium. Moreover, the first feature is "upper than", "above", or "on the top of" the second feature can be interpreted as the first feature is directly above or obliquely above the second feature, or merely indicated that the first feature is higher than the second feature. Also, the first feature is "lower than", "below/under", or "on the bottom of" the second feature can be interpreted as the first feature is directly below or obliquely below the second feature, or merely indicated that the first feature is lower than the second feature.

In the description of the present specification, the description of the terms "one embodiment", "some embodiments", "examples", "specific example", or "some examples", etc. means that the specific features, structures, materials or characteristics described in combination of the embodiments or examples are included in at least one embodiment or example of the present invention. In the present specification, the schematic representations of the above terms are not necessarily directed to the same embodiments or examples. Furthermore, the specific features, structures, materials, or characteristics described can be combined in a suitable manner in any one or more embodiments or examples. In addition, those skilled in the art can combine different embodiments or examples described in the present specification, as well as features of various embodiments or examples, without contradicting each other.

Although the embodiments of the present invention have been shown and described above, it can be understood that the above-mentioned embodiments are illustrative and cannot be interpreted as limits of the presented invention. Variations, modifications, substitutions and transformations of the above-mentioned embodiments may be derived by those skilled in the art within the scope of the present invention.

What is claimed is:

1. A self-driving steel coil transport vehicle capable of active steering, comprising:
   a load-bearing device;
   two bogies arranged in a front-rear manner along a running direction of the self-driving steel coil transport vehicle, wherein the two bogies are mounted below the load-bearing device; and
   wheels mounted under the two bogies, wherein four wheels are mounted under each bogie; and
   wherein, the load-bearing device is articulated with the two bogies, respectively; and wherein each bogie comprises:
   a vehicle frame, wherein the vehicle frame comprises: four wheel mounting portions, the four wheel mounting portions are pairwise disposed at lower portions of both sides of the vehicle frame, each wheel mounting portion is mounted with one of the wheels, a middle portion of the vehicle frame is provided with a bearing mounting hole facing upwardly, and the bearing mounting hole is internally provided with a horizontal stepped surface;
   a joint bearing, wherein the joint bearing is matched and connected with the bearing mounting hole, and a lower bottom surface of the joint bearing is installed on and fitted with the horizontal stepped surface; and a joint support seat, wherein a lower portion of the joint support seat is a shaft end, the shaft end is insertable into an inner ring of the joint bearing and is matched and connected with the joint bearing, an upper portion of the joint support seat is a connecting portion, and the joint support seat is connected to a lower portion of the load-bearing device through the connecting portion.

2. The self-driving steel coil transport vehicle capable of active steering according to claim 1, wherein each bogie further comprises:

a baffle mounted on an end of the shaft end, wherein one side surface of the baffle contacts the inner ring of the joint bearing.

3. The self-driving steel coil transport vehicle capable of active steering according to claim 1, wherein each bogie further comprises:

a locking plate, wherein a middle portion of the joint support seat is provided with a groove, and the locking plate is mounted above the vehicle frame and inserted in the groove.

4. The self-driving steel coil transport vehicle capable of active steering according to claim 1, wherein each bogie further comprises:

a locking plate, and wherein a middle portion of the joint support seat is provided with a protrusion, and the locking plate is mounted above the vehicle frame and presses the protrusion.

5. The self-driving steel coil transport vehicle capable of active steering according to claim 3, wherein the connecting portion is a flange, wherein the flange is provided with a fastening hole, and the fastening hole forms a circular track when rotating with the flange; and each vehicle frame is provided with two locking plates, the locking plates are detachably mounted on an upper surface of the vehicle frame by a plurality of locking plate bolts, and some or all of the plurality of locking plate bolts are located below the circular track.

6. The self-driving steel coil transport vehicle capable of active steering according to claim 1, comprising travel motors, and wherein at least two of the travel motors are provided, at least one of the wheels on each side of the two sides of the vehicle frame is connected to one of the travel motors in a transmission way, and each travel motor individually controls and drives the wheel connected to the travel motor.

7. The self-driving steel coil transport vehicle capable of active steering according to claim 6, wherein the travel motor is a speed reducing motor, and the travel motor is provided with a brake and a manual release handle.

8. The self-driving steel coil transport vehicle capable of active steering according to claim 1, wherein above the vehicle frame, two wear-proof plates respectively located on two sides of the bearing mounting hole are provided, and support wheels are provided at a position corresponding to the wear-proof plates below the load-bearing device, wherein an amount of the support wheels is the same as an amount of wear-proof plates.

9. The self-driving steel coil transport vehicle capable of active steering according to claim 1, comprising an electric control cabinet, a vehicle power supply, and a charging rail, wherein the electric control cabinet, the vehicle power supply, and the charging rail are mounted on the load-bearing device, the vehicle power supply is a rechargeable power supply device, and the charging rail is connected to a fixed charging end on a ground to charge the vehicle power supply.

10. The self-driving steel coil transport vehicle capable of active steering according to claim 9, wherein the load-bearing device comprises a steel coil saddle, a vehicle power supply bracket and an electric control cabinet bracket respectively disposed at two ends of the steel coil saddle, wherein the electric control cabinet and the vehicle power supply are respectively mounted on the electric control cabinet bracket and the vehicle power supply bracket; and a middle portion of the steel coil saddle is provided with a coil-bearing portion having longitudinal and transverse groove structures, and the coil-bearing portion is located in a middle of the two bogies.

11. The self-driving steel coil transport vehicle capable of active steering according to claim 1, comprising a front-end bumper bar and a rear-end bumper bar, wherein the front-end bumper bar is mounted on a front end of a front bogie, the rear-end bumper bar is mounted on a rear end of a rear bogie, the front-end bumper bar corresponds to a position of a rear-end bumper bar of a front vehicle running on the same track, and the rear-end bumper bar corresponds to a position of a front-end bumper bar of a rear vehicle running on the same track.

12. The self-driving steel coil transport vehicle capable of active steering according to claim 4, wherein the connecting portion is a flange, wherein the flange is provided with a fastening hole, and the fastening hole forms a circular track when rotating with the flange; and each vehicle frame is provided with two locking plates, the locking plates are detachably mounted on an upper surface of the vehicle frame by a plurality of locking plate bolts, and some or all of the plurality of locking plate bolts are located below the circular track.

13. The self-driving steel coil transport vehicle capable of active steering according to claim 2, further comprising travel motors, wherein at least two of the travel motors are provided, at least one of the wheels on each side of the two sides of the vehicle frame is connected to one of the travel motors in a transmission way, and each travel motor individually controls and drives the wheel connected to the travel motor.

14. The self-driving steel coil transport vehicle capable of active steering according to claim 3, further comprising travel motors, wherein at least two of the travel motors are provided, at least one of the wheels on each side of the two sides of the vehicle frame is connected to one of the travel motors in a transmission way, and each travel motor individually controls and drives the wheel connected to the travel motor.

15. The self-driving steel coil transport vehicle capable of active steering according to claim 4, further comprising travel motors, wherein at least two of the travel motors are provided, at least one of the wheels on each side of the two sides of the vehicle frame is connected to one of the travel motors in a transmission way, and each travel motor individually controls and drives the wheel connected to the travel motor.

16. The self-driving steel coil transport vehicle capable of active steering according to claim 13, wherein the travel motor is a speed reducing motor, and the travel motor is provided with a brake and a manual release handle.

17. The self-driving steel coil transport vehicle capable of active steering according to claim 14, wherein
the travel motor is a speed reducing motor, and the travel motor is provided with a brake and a manual release handle.

18. The self-driving steel coil transport vehicle capable of active steering according to claim 15, wherein
the travel motor is a speed reducing motor, and the travel motor is provided with a brake and a manual release handle.

19. The self-driving steel coil transport vehicle capable of active steering according to claim 2, wherein
above the vehicle frame, two wear-proof plates respectively located on two sides of the bearing mounting hole are provided, and support wheels are provided at a position corresponding to the wear-proof plates below the load-bearing device, wherein an amount of the support wheels is the same as an amount of wear-proof plates.

* * * * *